United States Patent [19]
Genero et al.

[11] Patent Number: 5,372,435
[45] Date of Patent: Dec. 13, 1994

[54] ROLLING BEARING SEAL ASSEMBLY WITH A BUILT-IN SENSOR

[75] Inventors: Matteo Genero, Via Sambuy; Mario Micca, Via Genova; Roberto Moretti, Strada Torino, all of Italy

[73] Assignee: SKF Industries S.p.A., Torino, Italy

[21] Appl. No.: 9,762

[22] Filed: Jan. 27, 1993

[30] Foreign Application Priority Data

Jan. 28, 1992 [IT] Italy ............................ TO92A000057

[51] Int. Cl.⁵ .............................................. F16C 32/00
[52] U.S. Cl. .................................. 384/448; 384/446; 277/2; 277/133
[58] Field of Search ............... 277/2, 13, 14 R, 133; 384/8, 9, 135, 446, 448, 472, 478

[56] References Cited

U.S. PATENT DOCUMENTS

| | | | |
|---|---|---|---|
| 4,732,494 | 3/1988 | Guers et al. | 384/448 |
| 4,946,295 | 8/1990 | Hajzler . | |
| 4,948,277 | 7/1990 | Alff . | |
| 4,968,156 | 11/1990 | Hajzler | 384/448 |
| 5,143,458 | 9/1992 | Alff et al. . | |
| 5,191,284 | 3/1993 | Moretti et al. | 384/448 X |

FOREIGN PATENT DOCUMENTS

| | | |
|---|---|---|
| 0378939 | 7/1990 | European Pat. Off. . |
| 0447641 | 9/1991 | European Pat. Off. . |
| 0464405 | 1/1992 | European Pat. Off. . |
| 2574501 | 6/1986 | France . |
| 2660975 | 10/1991 | France . |
| 192144 | 9/1985 | Japan .................. 384/484 |
| 246677 | 10/1988 | Japan .................. 384/484 |
| 2251076 | 6/1992 | United Kingdom . |
| 2251694 | 7/1992 | United Kingdom . |

*Primary Examiner*—Scott W. Cummings
*Attorney, Agent, or Firm*—Burns, Doane, Swecker & Mathis

[57] ABSTRACT

A rolling bearing seal assembly with a built-in sensor; the bearing including a first ring rotating in relation to a second ring, and a number of rolling bodies interposed between the first ring and the second ring and housed in a chamber defined between the two rings; and the seal assembly including at least one shielding element for closing the chamber and located facing the chamber and outside the bearing, and at least one sensor housed inside a seat formed inside the shielding element.

9 Claims, 1 Drawing Sheet

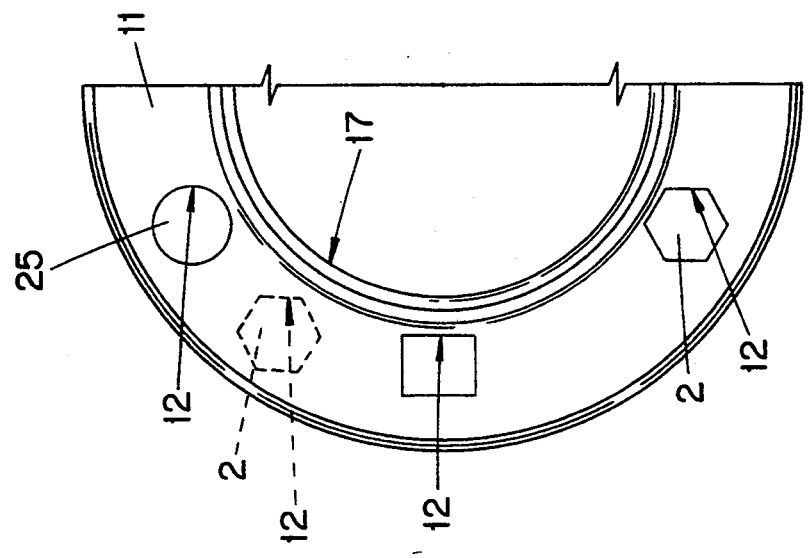
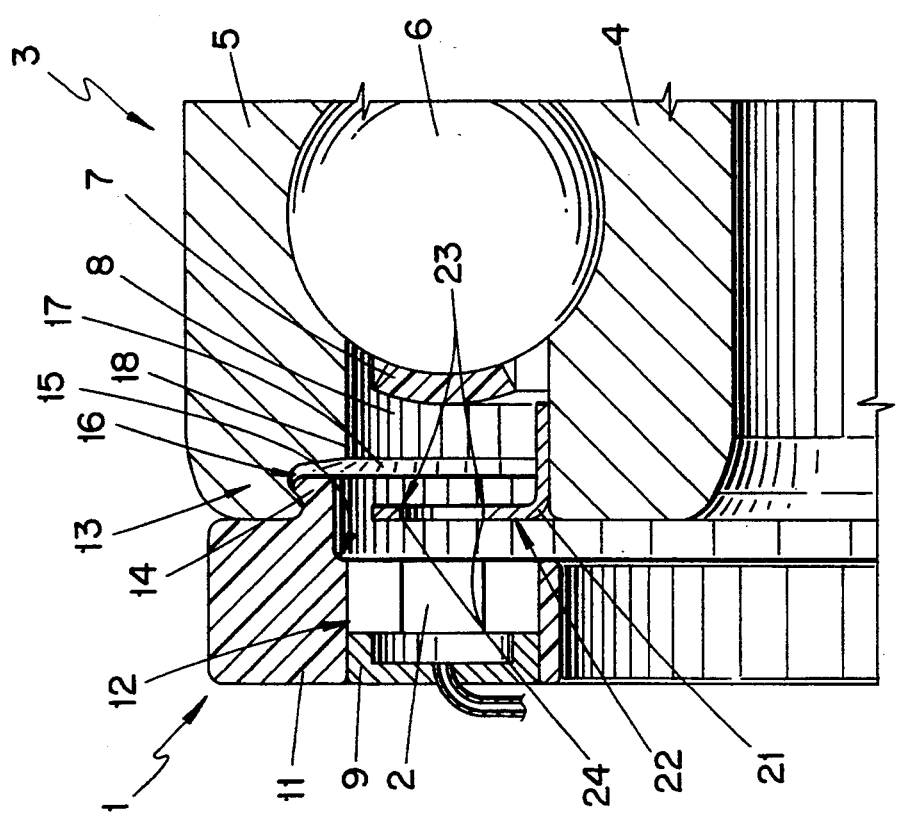

ROLLING BEARING SEAL ASSEMBLY WITH A BUILT-IN SENSOR

BACKGROUND OF THE INVENTION

The present invention relates to a seal assembly with a built-in sensor, particularly for rolling bearings.

For protecting the rolling bodies of rolling bearings from external pollution, normally consisting of solid or liquid particles, seal assemblies are fitted between the bearing rings. These consist of one or more annular shields fitted integral with one of the bearing rings, and which provide for sliding seal action on the other bearing ring by means of respective elastomeric lips and/or for labyrinth sealing.

The rotation speed of the movable ring, and consequently of the shaft integral with it, is normally determined using a speed sensor comprising a Hall-effect or magnetoresistance sensor, and arranged facing a phonic wheel fitted directly on to the shaft.

The phonic wheel is made of ferromagnetic material, and presents a number of equally-spaced, magnetically nonuniform portions. Here and hereinafter, the term "magnetically nonuniform portions" is intended to mean element portions whose passage in a magnetic field results in a variation of the magnetic field at said portions, e.g. a number of solids and voids, or a number of projections formed on a surface facing the sensor. When the phonic wheel is rotated by the shaft, the alternating magnetically nonuniform portions moving past the sensor result in a variation in magnetic inductance, and in the generation by the magnetic sensor of a periodic signal. This is supplied to a central processing unit, which, on the basis of the frequency of the signal, provides for computing the number of revolutions per unit of time of the wheel and consequently of the shaft.

A major drawback of the above solution is that, for ensuring accurate speed detection, the phonic wheel and sensor must be mounted perfectly opposite each other, with a minimum amount of, as far as possible, constant tolerance.

SUMMARY OF THE INVENTION

It is an object of the present invention to provide a rolling bearing seal assembly with a built-in sensor, designed to overcome the aforementioned drawback, and which provides for accurate, low-cost speed detection.

A further object of the present invention is to provide a seal assembly also designed to house other types of sensors, in particular, a sensor for detecting the internal temperature of the bearing.

According to the present invention, there is provided a rolling bearing seal assembly with a built-in sensor, the rolling bearing comprising a first ring movable in relation to a second ring, and a number of rolling bodies interposed between said first ring and said second ring and housed inside a chamber defined between said first and second rings; characterized by the fact that said seal assembly comprises at least one shielding element for closing said chamber, located opposite said chamber and outside said bearing, and having means for connection to said second ring of said bearing; said seal assembly also comprising at least one sensor housed inside a first seat formed inside said shielding element.

BRIEF DESCRIPTION OF THE DRAWINGS

A non-limiting embodiment of the present invention will be described by way of example with reference to the accompanying drawings, in which:

FIG. 1 shows a partial section of a rolling bearing featuring a seal assembly in accordance with the present invention;

FIG. 2 shows a detail of the FIG. 1 seal assembly.

DETAILED DESCRIPTION OF THE INVENTION

With reference to FIGS. 1 and 2, number 1 indicates a seal assembly with a built-in sensor 2, a rolling bearing 3.

Bearing 3 comprises a first ring 4 rotatable in relation to a second ring 5; and a number of rolling bodies 6 interposed between rings 4 and 5, housed inside a chamber 8 defined between rings 4 and 5, and held in position by a retainer 7.

According to the present invention, seal assembly 1 comprises an annular shielding element 11 for closing chamber 8, and located opposite chamber 8 and outside bearing 3. Shielding element 11 presents a seat 12 housing sensor 2; and means 13 for connection to ring 5 and substantially consisting of an appendix 14 projecting from the inner side 15 of element 11 facing ring 5, and designed to click inside a corresponding annular groove 16 formed in inner wall 18 of ring 5. Groove 16 is so formed as to define a seat for a conventional type seal (not shown, by virtue of being replaced, in the example shown, by element 11).

As shown in FIG. 1, outwards of sensor 2, seat 12 is closed by a cover element such as a plug 9.

According to the present invention, movable ring 4 is fitted integral with a second shielding element 21 made of ferromagnetic material and the lateral wall 22 of which, facing sensor 2, presents magnetically nonuniform portions 23 consisting, for example, of holes 24 formed in wall 22. Shielding element 21 presents a substantially sleeve type structure.

Sensor 2 in shielding element 11 consists of a magnetic sensor, preferably a Hall-effect or magnetoresistance type, and second shielding element 21 substantially constitutes a phonic wheel, so that elements 2 and 21 combine to define a rotation speed sensor.

As shown in FIG. 2, shielding element 11 is so designed as to accommodate a number of seats 12, possibly of different shapes, and each housing a different type of sensor. According to the present invention, therefore, element 11 may be fitted simultaneously with both sensor 2 and, for example, a known type of miniaturized temperature sensor 25 (not shown in detail) housed inside a second seat 12, offset angularly in relation to seat 12 of sensor 2, for continuously and accurately determining the temperature inside bearing 3. Fitment of a second sensor 2 (as shown by the dotted line) in a third seat 12, offset angularly by a given amount in relation to seat 12 of the first sensor 2, also provides for determining the rotation direction of ring 4 of bearing 3, by providing, in conjunction with element 21, two speed sensors in two different angular positions on element 11. Detection of the signal sequence of the two sensors 2 thus provides for determining not only the rotation speed but also the rotation direction of ring 4.

In actual use, sensor 2, connected to a measuring unit (not shown), is fitted inside one of seats 12 on element 11, and arranged facing shielding element 21 integral with movable ring 4 of bearing 3.

When ring 4 is rotated in relation to ring 5, the succession of magnetically nonuniform portions 23 moving past sensor 2 modifies the magnetic circuit represented substantially by sensor 2 and facing ferromagnetic element 21, thus resulting in a variation in magnetic inductance and in the operating parameters of sensor 2.

The variation in the operating parameters of sensor 2 is recorded by a measuring unit (not shown), which provides for determining the number of such events per unit of time, and so determining the rotation speed of ring 4 in relation to ring 5.

The advantages of the present invention will be clear from the foregoing description. The manufacture of increasingly miniaturized sensors enables a number of sensors, arranged facing the rolling body chamber between the bearing rings, to be integrated in one seal formed according to the present invention and secured integral with the fixed bearing ring, the sensors being faced to the space provided between the rolling bodies and the rings. In the case of a speed sensor, the phonic wheel is housed directly inside the chamber itself, so that, in addition to constituting a passive component of the rotation speed measuring circuit, it also provides actively, in the form of a second seal, for protecting the rolling bodies interposed between the bearing rings.

Elimination of the conventional phonic wheel and integration of the sensors inside the sealing element also provide for simplifying and reducing the cost of assembly.

We claim:

1. A rolling bearing seal assembly with a built-in sensor, the rolling bearing comprising a first ring movable in relation to a second, fixed ring, and a number of rolling bodies interposed between said first ring and said second ring and housed inside a chamber defined between said first and second rings; said seal assembly comprising at least one shielding element for closing said chamber, said shielding element being located opposite said chamber and outside said bearing, means for connecting said at least one shielding element to said second ring of said bearing; said connecting means including an annular appendix projecting axially from a side of said at least one shielding element facing said fixed ring, said appendix being designed to mate with a corresponding groove formed in an inner wall of said second ring; said seal assembly also including at least two sensors housed completely inside seats formed inside said at least one shielding element.

2. A seal assembly as claimed in claim 1, further comprising a second shielding element fitted integral with said first ring of said bearing; said second element being made of ferromagnetic material and presenting magnetically nonuniform portions.

3. A seal assembly as claimed in claim 2, wherein a first of said sensors in said first shielding element comprises a magnetic sensor, said second shielding element comprising a phonic wheel.

4. A seal assembly as claimed in claim 2, wherein said second shielding element is a substantially sleeve type structure.

5. A seal assembly as claimed in claim 3, wherein said magnetic sensor is selected from one of a Hall-effect and magnetoresistance type sensor.

6. A seal assembly as claimed in claim 1, wherein a second of said sensors comprises a sensor for detecting the temperature inside said bearing; said temperature sensor being housed in one of the seats formed in said first shielding element; said second seat being angularly offset in relation to said first seat.

7. A seal assembly as claimed in claim 6, further comprising at least two speed sensors for determining the rotation direction of said movable ring of said rolling bearing.

8. A seal assembly as claimed in claim 1, wherein faces of the at least two sensors are arranged such that an external surface is flush with a surface of the shielding element directed toward the chamber.

9. A seal assembly as claimed in claim 1, wherein the shielding element is snap-connected with the groove formed in the inner wall of said second ring.

* * * * *

UNITED STATES PATENT AND TRADEMARK OFFICE
CERTIFICATE OF CORRECTION

PATENT NO. : 5,372,435
DATED : December 13, 1994
INVENTOR(S) : Matteo GENERO et al.

It is certified that error appears in the above-indentified patent and that said Letters Patent is hereby corrected as shown below:

ON THE TITLE PAGE:

[75] Inventors: please delete "Via Sambuy" and insert therefor --Santena--;

please delete "Via Genova" and insert therefor --Torino--; and please delete "Strada Torino" and insert therefor --Moncalieri--.

[73] Assignee: please delete "Industries" and insert therefor --Industrie--.

Signed and Sealed this

Second Day of May, 1995

*Attest:*

BRUCE LEHMAN

*Attesting Officer*     *Commissioner of Patents and Trademarks*